United States Patent [19]
Capehart

[11] Patent Number: 5,547,584
[45] Date of Patent: Aug. 20, 1996

[54] TRANSPORTABLE, SELF-CONTAINED WATER PURIFICATION SYSTEM AND METHOD

[75] Inventor: Jimmie D. Capehart, Sadler, Tex.

[73] Assignee: Electronic Drilling Control, Inc., Irving, Tex.

[21] Appl. No.: 214,644

[22] Filed: Mar. 17, 1994

[51] Int. Cl.[6] .................................................. B01D 15/00
[52] U.S. Cl. ......................... 210/669; 210/241; 210/259; 210/266; 210/652; 210/746; 210/760; 210/764; 210/806
[58] Field of Search ................................... 210/143, 192, 210/202, 241, 259, 260, 663, 702, 739, 804, 806, 764, 321.6, 652, 705, 748, 760, 764, 961, 258, 195.1, 805, 266, 669, 746

[56] References Cited

U.S. PATENT DOCUMENTS

| 623,894 | 4/1899 | Freise | 210/241 |
|---|---|---|---|
| 3,779,909 | 12/1973 | Wisfield et al. | 210/760 |
| 4,659,460 | 4/1987 | Muller et al. | 210/241 |
| 5,174,901 | 12/1992 | Smith | 210/806 |
| 5,190,659 | 3/1993 | Wang et al. | 210/806 |
| 5,236,673 | 8/1993 | Coakley et al. | 422/186.07 |
| 5,268,300 | 12/1993 | Latura et al. | 210/241 |
| 5,399,260 | 3/1995 | Eldredge et al. | 210/241 |

FOREIGN PATENT DOCUMENTS

| 2215391 | 8/1974 | Germany | 210/241 |
|---|---|---|---|
| 150849 | 11/1979 | Japan | 210/241 |
| 1299694 | 12/1989 | Japan | 210/241 |
| 9001019 | 2/1990 | WIPO | 210/739 |

*Primary Examiner*—Joseph W. Drodge
*Attorney, Agent, or Firm*—Jenkens & Gilchrist, P.C.

[57] ABSTRACT

A self-contained, self-sufficient system and method for purifying non-potable water to make the water potable is disclosed. The system comprises (a) means for oxidizing which treats the non-potable water by oxidizing organic substances, disinfecting the non-potable water by destroying parasites, bacteria and viruses, and causing coagulation of colloids, (b) means for filtering the treated non-potable water wherein oxidized organic substances, destroyed parasites, bacteria and viruses, and colloids are removed to provide potable water, and (c) means for optionally generating a biocide from dissolved salts when dissolved salts are present in the non-potable water. The system can also include means for contacting potable water generated by the system with a biocide. The system is self-contained and self-sufficient, requiring no external resources for the continuous operation thereof. The system and method are controlled by a programmable logic controller to provide optimization, quality control, and damage prevention.

31 Claims, 7 Drawing Sheets

TRANSPORTABLE, SELF-CONTAINED WATER PURIFICATION SYSTEM AND METHOD

BACKGROUND OF THE INVENTION

1. Field of the Invention

The invention generally relates to systems and methods for purification of water and, more particularly, relates to transportable self-contained water purification systems which require external supplies of fuel for powering an on-board electric power generator and a high pressure reverse osmosis pump, but which are otherwise self-contained, internally generating from the ambient air and the water being treated all other resources necessary for treatment of the water.

2. Description of the Related Art

Water covers more than two-thirds of the earth's surface. Nevertheless, there are many areas throughout the earth where water is scarce or where water, even if available, is not potable. Potable water is water that is suitable for humans and animals to drink and which meets minimum quality standards that may apply.

A great amount of the water on earth is brackish or sea water. Brackish and sea waters are typically not suitable for human and animal consumption because the waters contain salts and sediments which may be harmful. In addition, brackish and sea waters are often unsuitable for other desired uses.

In addition to brackish and sea water, so-called "fresh" water may also be unsuitable for use in certain circumstances. "Fresh" water may be unsuitable if it is polluted or contains certain bacteria or other microorganisms. For these and other reasons, waters found in many locations are not suitable for drinking or other desired uses.

As is generally known, water may be found in pools at the earth's surface or within the subsurface strata.

Surface water may be contaminated by events occurring at the surface. Subsurface water may be polluted by substances seeping through the earth's strata to enter formations containing the water. In any event, both surface water and water obtained from subsurface strata may require treatment prior to consumption and other use by humans and animals.

A number of water treatment systems and methods have been previously developed. Those water treatment systems and methods have sought to treat waters, either surface or subsurface, to make the waters potable. For treatment of large amounts of water, such as to supply cities and towns, large-scale water treatment facilities are generally necessary. These facilities typically include numerous tanks, large pumps, filtration apparatus, and chemical treating facilities. For smaller-scale water treatment, a variety of apparatus and methods are known. Those apparatus and methods typically include combinations of filters for filtration and chemicals for chemical treatment.

There have been earlier attempts to develop a transportable, self-contained water purification system capable of treating and supplying significantly large quantities of potable water. Those prior systems and methods have not been satisfactory, however, for many water treatment applications. For example, some of the systems and methods have been designed to treat only so-called "fresh" water. Those systems have generally treated the "fresh" water by filtration and addition of chemical disinfectants. The filtration serves to remove particulate matters from the water and the chemical disinfectants serve to render the water microbiologically suitable. Those systems and methods for treating "fresh" water typically have not served to remove dissolved substances in the water, for example, salts, which are found in brackish and sea waters.

Attempts have previously been made to develop transportable, self-contained water purification systems and methods for treating brackish and sea water and other waters containing dissolved substances. Those attempts have employed various chemicals and filter processes to prepare the water for a separate treatment process known as reverse osmosis. Reverse osmosis is the separation of solutes from a solution by causing the solvent to float through a membrane at pressures higher than the normal osmotic pressure. This is possible because of the phenomenon of osmosis. In osmosis, a solvent diffuses through a semi-permeable membrane from an area of greater osmotic pressure (i.e., greater concentration of dissolved substance) to an area of lower osmotic pressure (i.e., lesser concentration of dissolved substance). In reverse osmosis, the solvent diffuses through a membrane filter leaving dissolved substances, such as salts and other contaminants, behind.

Those prior technology water treatment systems and methods employing reverse osmosis have several limitations. For instance, those systems and methods have had limited throughput capacity and limited range of treatable input water quality. In addition, those systems and methods have required input of various consumable chemicals and apparatus to the systems and methods, as well as consumable resources for power generation, such as petroleum fuel. Often, these inputs are relatively quickly consumed by the systems and methods during operation and must be continuously or regularly added.

Even further, certain of those prior systems and methods employing reverse osmosis have been limited by requiring particular care in operations because toxic by-products are generated. Those toxic by-products, once generated in the operations, are not easily removed from the systems. Even if removed, those by-products present handling and disposal problems. As can be readily understood and appreciated, a system and method for water treatment which overcomes the limitations and problems of the prior technology and which is also transportable and self-contained would be a significant advantage in the art.

More particularly with respect to toxic by-product generation by the prior systems and methods, the prior technology portable water purification units have employed chlorine for pre- and post-oxidation/disinfection. The use of chlorine as a pre-oxidant (i.e., employed prior to filtration) causes formation of trihalomethanes, which are known carcinogens. Once formed, trihalomethanes are very difficult to remove from water being treated. Prevention of trihalomethane formation, rather than removal, then, is most desirable.

In the prior technology, ozone has sometimes been employed, rather than chlorine, as a pre-oxidant to avoid the problem of trihalomethane formation. Ozone use does not result in trihalomethane formation, but large concentrations of ozone are necessary to accomplish the intense oxidation necessary for water treatment. These large concentrations of ozone cannot be generated by the typical systems and methods, so it has been necessary to supply ozone to those systems and methods from an external source. Ozone availability can be limited or non-existent in many locales.

Also more particularly with respect to external resources required by the prior systems and methods, the prior transportable water purification systems and methods have typically used small, disposable cartridge filters for removal of particulates in the water being treated. Those filters have generally been capable of removing only particulates down to particular sizes for which the filter was designed. In use, filters designed for removal of only larger particulates may be used longer than filters designed for removal of smaller particulates. This is the case because filters designed for removal of larger particulates allow many small particles to pass and the filters do not quickly become clogged. On the other hand, filters designed for removal of smaller particulates pass fewer particles, thus, retaining more. The filters designed for removal of smaller particulates, therefore, tend to have short life-spans, becoming clogged quickly because of the greater number of particulates filtered by those filters from water being treated. Typically, the prior technology filters have been disposed of after use and have not been cleanable and reusable.

Further regarding filters of the prior technology transportable water treatment systems and methods, those systems and methods have in rare instances employed granular activated carbon filter media (GAC). Those that have employed GAC have been small cartridge-style filters. Those filters have not been cleanable and were necessarily disposed of and replaced after a period of use. Further in the prior art systems and methods, much of the adsorptive capacity of GAC filters, when employed, has been spent in removal of chlorine pre-oxidizer, rather than removal of matter from water being treated.

There are at least two known prior technology transportable systems for water purification on a significant scale. One of those systems, referred to in the trade as the "global water system LS3," has the disadvantage of not being useable in treating water containing high total dissolved solids (TDS) (e.g., brackish and sea waters contain high TDS). In addition, that system uses chlorine as a pre-oxidant, thus, resulting in trihalomethane formation and ensuing problems therewith. Further in that system, manual adjustment of chlorine dosage is required which gives variable treatment results and may be subject to human error. That system further includes only a single, non-reusable filter train which must be periodically replaced, and the replacement requires shutdown of the entire system.

The second known, prior technology portable water purification system is used by the U.S. Army and is called the "ROWPU" (for reverse osmosis water purification unit). This system requires addition of a coagulant aid for aiding removal of fine particles and colloids. This coagulant aid is consumed in the system and so must be continuously, or at least regularly, added to the system by an operator. The operator's involvement may lead to variable results, and there is the possibility of human error. Even further, the system requires addition of a scale inhibitor that is also consumed by the system. The system includes a single-stage cartridge filter that is non-reusable. The filter is not satisfactory for many applications, as it will pass viruses, giardia, cryptosporidium, and other bacteria. The system further employs reverse osmosis membranes that foul and must be replaced, and requires addition of residual disinfectant that is consumable and must be added or generated at the system site.

The present invention overcomes the problems of the prior technology water treatment systems and methods and, particularly, the transportable systems and methods previously available. In addition to overcoming the problems of the prior technology systems and methods, the present invention provides numerous additional features not found in the prior technology and improvements over a number of aspects of the prior technology. As will be understood and appreciated by those skilled in the art, the invention is a significant improvement in the technology and provides the herein described advantages and improvements, and many others.

SUMMARY OF THE INVENTION

In one embodiment, the invention is a system for water purification. The system comprises means for filtering water input to the system, means for oxidizing organic substances in the water input to the system, the means also disinfecting the water by destroying parasites and bacteria and inactivating viruses in the water, the means even further causing coagulation of colloids in the water, and means for contacting the water with chlorine to further disinfect the water.

In another aspect, the water is filtered by the means for filtering prior to chlorine contact via the means for contacting.

In yet another aspect, the system is self-contained and capable of substantially continuous operations for significant periods of time, requiring only petroleum fuel from external sources for the operations.

In even another aspect, the system further comprises a wheeled trailer of the type which may be towed along a road by truck or automobile, each of the means for filtering, the means for oxidizing, and the means for contacting being fully contained within the wheeled trailer.

In a further aspect, the system further comprises means for desalination to remove solutes from the water.

In even a further aspect, the means for filtering includes cartridge filters and granular activated charcoal filters, the means for oxidation includes an ozone contact chamber supplied with ozone and into which the water is input to effect contacting of the ozone with the water, and the means for contacting includes a chlorine contact chamber supplied with liquid chlorine to effect contacting of the liquid chlorine with the water.

In yet a further aspect, the system further comprises a wheeled trailer of the type which may be towed along a road by truck or automobile, each of the means for filtering, the means for oxidizing, and the means for contacting being fully contained within the wheeled trailer.

In another aspect, the system further comprises means for controlling the system during operations, the means providing for fully automated operation of the system.

In yet another aspect, the means for filtering includes cartridge filters and granular activated charcoal filters, the means for oxidation includes an ozone contact chamber supplied with ozone and into which the water is input to effect contacting of the ozone with the water, and the means for contacting includes a chlorine contact chamber supplied with liquid chlorine to effect contacting of the liquid chlorine with the water.

In even another aspect, the means for controlling includes a programmable logic controller.

In a further aspect, the system further comprises means for controlling the system during operations, the means providing for fully automated operation of the system.

In even another aspect, the means for controlling includes a programmable logic controller.

In another embodiment, the invention is a method of water purification. The method comprises the steps of filtering water input to the system, oxidizing organic substances in the water input to the system, the step of oxidizing also serves to disinfect the water by destroying parasites and bacteria and inactivating viruses in the water, the step of oxidizing further causes coagulation of colloids in the water, and contacting the water with chlorine to further disinfect the water.

In one aspect, the step of filtering occurs prior to the step of contacting.

In another aspect, the steps are substantially continuously performed for significant periods of time without any step of providing external resources other than petroleum fuel.

In yet another aspect, the method further comprises the steps of transporting a wheeled trailer of the type which may be towed along a road by truck or automobile and containing each of the steps of filtering, oxidizing, and contacting fully within the trailer.

In even another aspect, the method further comprises the step of desalinating the water to remove solutes.

In yet another aspect, the step of filtering is performed by cartridge filters and granular activated charcoal filters, the step of oxidizing includes supplying ozone and the water to an ozone contact chamber to contact the ozone with the water, and the step of contacting includes supplying liquid chlorine and the water to a chlorine contact chamber to contact the liquid chlorine with the water.

In another aspect, the method further comprises the steps of transporting a wheeled trailer of the type which may be towed along a road by truck or automobile and containing each of the steps of filtering, oxidizing, and contacting fully within the wheeled trailer.

In a further aspect, the method further comprises the step of controlling the steps, wherein the step of controlling is fully automated.

In another further aspect, the step of filtering is performed by cartridge filters and granular activated charcoal filters, the step of oxidizing includes supplying ozone and the water to an ozone contact chamber to contact the ozone with the water, and the step of contacting includes supplying liquid chlorine and the water to a chlorine contact chamber to contact the liquid chlorine with the water.

In yet a further aspect, the step of controlling is performed via a programmable logic controller.

In another aspect, the method further comprises the step of controlling the steps, wherein the step of controlling is fully automated.

In yet another aspect, the step of controlling is performed via a programmable logic controller.

In yet another embodiment, the invention is a system for purifying non-potable water to make the water potable. The system comprises an intake pump for bringing the water into the system, a first filter, connected to the intake pump, the water passing through and being filtered by the first filter, an ozone contact chamber, connected to the first filter, the water passing through the ozone contact chamber and being contacted with ozone in the ozone contact chamber, a second filter, connected to the ozone contact chamber, the water passing through and being filtered by the second filter, a first granular activated carbon filter, connected to the second filter, the water passing through the first granular activated carbon filter, a third filter, connected to the first granular activated filter, the water passing through and being filtered by the third filter, a second granular activated carbon filter, connected to the third filter, the water passing through the second granular activated carbon filter, a fourth filter, connected to the second granular activated carbon filter, the water passing through and being filtered by the fourth filter, and a chlorine contact chamber, connected to the fourth filter, the water passing through the chlorine contact chamber and being contacted with liquid chlorine in the chlorine contact chamber.

In another aspect, the system further comprises a means for desalinating the water, the means connected to the fourth filter and the chlorine contact chamber.

In yet another aspect, the system is self-contained and capable of substantially continuous operations for significant periods of time, requiring only petroleum fuel from external sources for the operations.

In even another aspect, the system is portable.

In a further aspect, the system further comprises a means for ozone generation, the means receiving water for purposes of cooling and the means inputting generated ozone to the ozone contact chamber.

In another further aspect, the system further comprises means for detecting a first oxidation reduction potential of the water at a select location of the system and recirculating at least some of the water from the ozone contact chamber back into the ozone contact chamber in response to the first oxidation reduction potential detected to obtain the water from the system having a select second oxidation reduction potential.

In yet another aspect, the system is fully automated and controlled by a programmable logic controller.

In another embodiment, the invention is a method of purifying non-potable water to make the water potable. The method comprises the steps of bringing the water into the system, filtering the water by passing the water through a first filter, contacting the water with ozone, filtering the water by passing the water through a second filter, passing the water across a first granular activated carbon filter, filtering the water by passing the water through a third filter, passing the water across a second granular activated carbon filter, filtering the water by passing the water through a fourth filter, and contacting the water with chlorine.

In another aspect, the method further comprises the step of desalinating the water.

In yet another aspect, the steps are substantially continuously performed for significant periods of time and require only petroleum fuel from external sources for the performance.

In even another aspect, the method is transportable.

In a further aspect, the system further comprises the step of generating ozone electrically across electrodes.

In yet a further aspect, the system further comprises the steps of detecting a first oxidation reduction potential of the water at a select location of the system and recirculating at least some of the water from the ozone contact chamber back into the ozone contact chamber in response to the first oxidation reduction potential detected to obtain the water from the system having a select second oxidation reduction potential.

In another aspect, the method is fully automated and controlled by a programmable logic controller.

BRIEF DESCRIPTION OF THE DRAWINGS

For a more complete understanding of the present invention and for further objects and advantages thereof, reference may now be had to the following description in conjunction with the accompanying drawings, in which.

DETAILED DESCRIPTION OF THE INVENTION

The present invention is, in one embodiment, a system and method for water treatment that is substantially self-contained and transportable. The system and method overcome the problems of the prior technology, due primarily to the sequence and arrangement of the apparatus and steps of the invention. Other improvements and advantages are also realized.

Generally, the invention embodiment includes a bactericidal unit comprising ozone pre-treatment prior to a reverse osmosis (desalination) process. The bactericidal unit includes various steps of filtration, certain of which are by granular activated carbon beds (GAC). Water treated by the bactericidal unit is fed to a desalination unit which, in the invention embodiment, includes steps of filtration and reverse osmosis. The bactericidal unit also includes a chlorine treatment step for water disinfection. Due to the particular apparatus and method steps, the invention embodiment provides for reusable filters, limited manpower involvement in most instances, no formations of toxins, such as trihalomethanes, and long periods of continuous operation without the necessity of shutdown or supply of extraneous substances and equipment.

Figure 1:
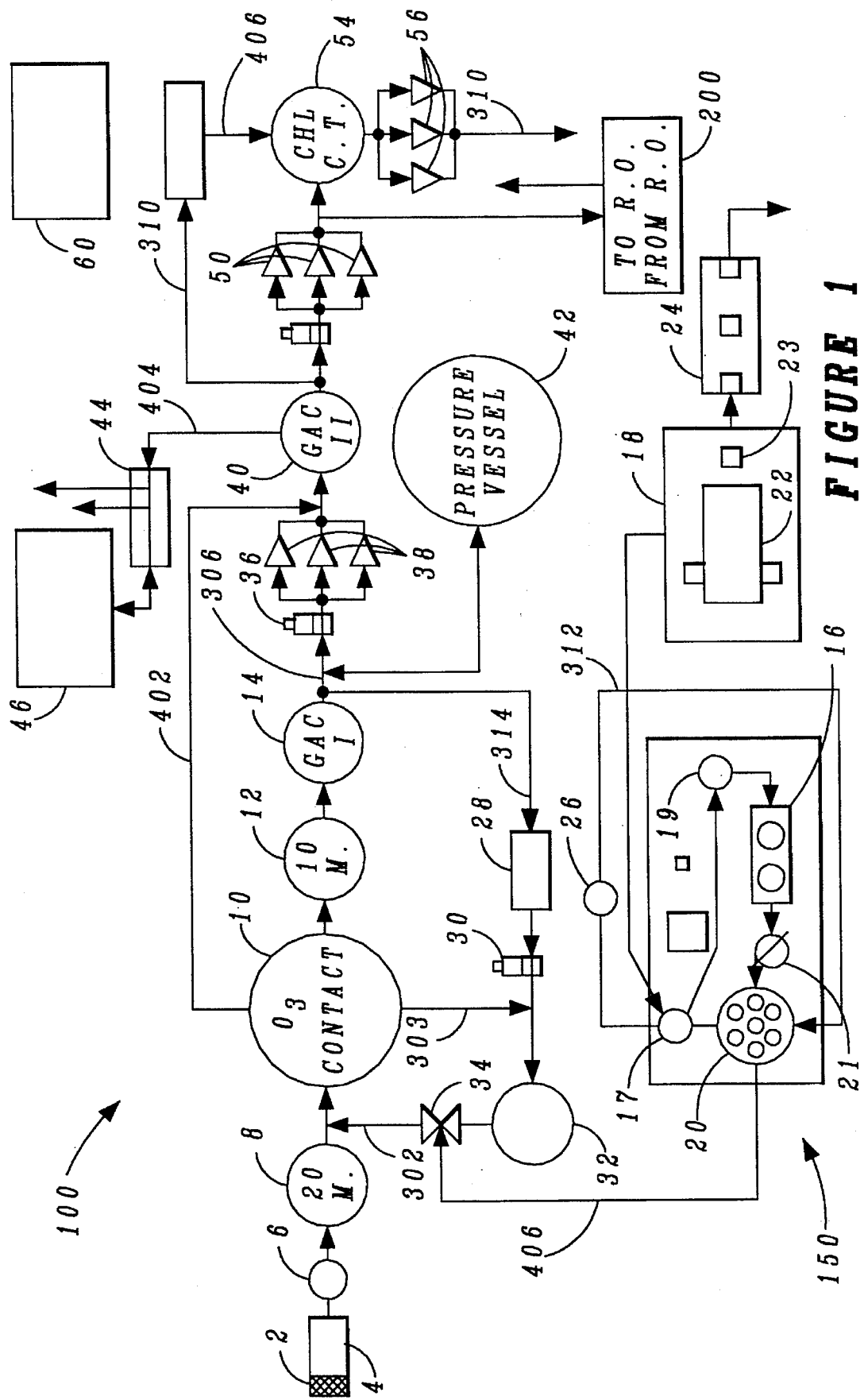
FIG. 1. is a simplified, illustrative, flow-diagram of the system and method of the bactericidal unit of the present invention.

Referring first to FIG. 1, a simplified, illustrative flow-diagram of the bactericidal unit 100 of a preferred embodiment of the invention is depicted. Water to be treated first enters the invention apparatus through a strainer 2. The strainer 2 is preferably suitable to strain particles ⅜" and larger from the water as it enters the unit 100. After the strainer 2, the water passes to a foot valve 4. The foot valve 4 prevents backflow or loss of prime at the unit 100 inlet. As will be hereinafter more fully discussed, the invention apparatus is electronically controlled to allow for optimum operation, including with the first water fed to the system for treatment. The foot valve 4 serves to limit flow of water to the system until all system features are ready to begin treatment. Although other valves and strainers may be employed, in a preferred embodiment, the foot valve 4 is a Teel, Brady Model SFV-150, 1 ½" NPT size (Stock No. 2A649) and the strainer 2 is that supplied with the foot valve 4.

Still referring to FIG. 1, in the invention embodiment, water for treatment is caused to flow through the system apparatus by an intake pump 6. This intake pump 6 is located after the strainer 2 and foot valve 4 along the flow of the intake water. A variety of intake pumps may be employed, however, the intake pump 6 is preferably a centrifugal pump driven by an electric motor. Even more preferably, the intake pump 6 is a Challenger™ High Head High Performance ½ hp pump distributed by PAC-FAB of Sanford, N.C. The electric motor driving the intake pump 6, in the preferred arrangement, is powered by a gas-powered electric generator, more preferably a 13 hp 9000 watt peak power 220 single-phase generator Model 3W739 distributed by Dayton Electric Manufacturing Company of Chicago, Ill. (not shown in detail). This electric generator supplies all electrical power utilized by the invention embodiment in operation. Other electric generators or sources of electric power may alternatively be employed.

Continuing to refer to FIG. 1, the water being treated by the invention embodiment flows from the intake pump 6 to a cartridge filter 8. The cartridge filter 8 may be any type of filter capable of removing particles from water, however, the cartridge filter 8 is preferably a 25 μ filter of the type distributed by Sta-Rite Industries, Inc. of Waterford, Wis., and referred to as POSI*FLO® II FILTER Model PTM70. The preferred cartridge filter 8, as well as any other type filter, employed in the system, will be removable and cleanable and, then, reusable in the system. Removal of the cartridge filter 8 (and cartridge filter 12 hereinafter discussed) from the unit 100 and cleaning and replacement thereof can be accomplished during regular scheduled maintenance shut-down intervals for the unit 100 operations (e.g., 25 hour intervals). Other filters of the unit 100 (e.g., filters 38, 50, 56 hereinafter more fully discussed) may be cleaned and/or replaced without shut-down of the unit 100 operations due to the capability of shutting-off portions of the unit 100 while maintaining water circulation in the rest of the unit 100.

Further referring to FIG. 1, it is notable that, though the cartridge filter 8 (and cartridge filter 12 as hereinafter discussed) of the unit 100 may be removed and cleaned, cleaning will typically not be necessary more often than at regular service intervals for the unit 100. Those filters which may require more frequent cleaning (e.g., filters 38, 50, 56 hereinafter discussed) have been arranged in parallel arrays with other filters, allowing shut-down of one filter of the array at a time for cleaning without shut-down of the entire unit 100. It is also notable that the filters employed in the unit 100 and, in particular, the preferred filters, are not necessarily intended to be cleanable and reusable. Because such filters are useable with the unit 100, filter costs for the unit 100 are reduced. In order to allow for filter cleaning, the unit 100 may be equipped with an ultrasonic cleaning apparatus (not shown in detail), preferably a Genesis™ model ultrasonic cleaner available from Crest Company. Electrical power for operating the ultrasonic cleaning apparatus may be provided by the electrical generator of the unit 100.

Still referring to FIG. 1, water having passed through the cartridge filter 8 is, in the embodiment, fed to an ozone contact chamber 10. Note that a recirculated portion 302 of the water being treated mixes with the water passing from the cartridge filter 8 prior to entry into the ozone contact chamber 10. This combined water, as will be hereinafter more fully explained, includes ozone ($O_3$) and enters the ozone contact chamber 10 where pre-oxidation and disinfection occurs. The ozone contact chamber 10 may be any vessel suitable for containing ozone and the water for contact. Preferably, however, the ozone contact chamber 10 is a vessel, Model HRPB30, obtained from the previously mentioned Sta-Rite Industries, Inc. In the ozone contact chamber 10, the ozone contacts with the water being treated. This contacting of ozone with the water disinfects the water by destroying parasites and bacteria and inactivating viruses. The contacting also oxidizes organic substances in the water to convert them to a more readily biodegradable form. Even further, the contacting of ozone with the water causes coagulation of colloids in the water so that the colloids may be removed by filtration. In the preferred embodiment, ozone is contacted with water in amounts of at least about 0.2 ppm for four minutes of contact time. The oxidation reduction potential (ORP) of the water being contacted by ozone is monitored as hereinafter detailed. As also hereinafter more fully described, ozone is preferably generated on-board the unit 100 by an ozone generation unit 150 and the ozone supply is controlled to maintain the ORP at a desired level to obtain desired output water from the system.

Still referring to FIG. 1, in the invention embodiment, after the water is contacted with ozone in the ozone contact chamber 10 in quantities and for periods of time previously described, the water flows through another cartridge filter 12. This cartridge filter 12 may also be any filter suitable for filtering particulates from water. This cartridge filter 12 is preferably, however, a 10 µ filter, and more preferably a 10 µ BETAPURE® Filter Cartridge contained in a CUNO TYPE DC cartridge filter housing, each available from CUNO Inc., Meriden, Conn. Tests with the preferred embodiment of the invention have shown that bacterial reduction from 1.1 billion colony forming units (CFU) to 10 CFU is obtained by the previously stated dosage and retention of ozone combined with filtration by the 10 µ cartridge filter 12.

Continuing to refer to FIG. 1, in the embodiment of the invention, water output from the cartridge filter 12 is mixed with recirculated water (not shown in detail in FIG. 1, but recirculated from a second GAC 40 hereinafter discussed) from ozone generation and fed to a first granular activated carbon filter (GAC) 14. This first GAC 14 is preferably a STA-RITE® System 3 high rate sand filter vessel, Model S8S70 from Sta-Rite Industries, Inc., which vessel contains granular activated carbon. The granular activated carbon is preferably acid washed, 12/40 mesh 92%, 8% 12/30 roasted coconut shells which may be obtained from ACCOA of Dallas, Tex. Other vessels and granular activated carbon can be employed. At the first GAC 14, the water fed to the GAC 14 is passed over a granular activated carbon bed, preferably in a manner giving an empty bed contact time of four minutes. The granular activated carbon of the GAC 14 initially adsorbs organics in the water and, as the granular activated carbon is in sustained use, colonies of aerobic microorganisms grow thereon which allows also for biodegradation of organics. In this step, therefore, total organic carbons and volatile organic carbons are 20 adsorbed onto the granular activated carbon media of the first GAC 14, and, once microorganism colonies grow thereon, the media serves also to degrade the organic carbons. Still referring to FIG. 1, in the embodiment, water exiting the first GAC 14 is separated into two flows 306, 314. A portion of the water 314 recirculates to join with water 302 entering the ozone contact chamber 10. The flow of this portion of the water 314 will later be described in more detail in conjunction with the description of the recirculation of water of the system and the ozone generation unit 150 of the system.

Further referring to FIG. 1, the other portion of the water 306, in the embodiment, exiting the first GAC 14 continues flowing through the unit 100. At this location along the water 306 flow path, a pressure vessel 42 serves as a water storage facility to allow the intake pump 6 to cycle without water hammer. The pressure vessel 42 prevents water hammer by maintaining appropriate flow levels in the unit 100 when water is being recirculated. Maintaining appropriate pressure and flow throughout the unit 100 is important in order to prevent undesirable flow effects. As will be hereinafter more completely described, the pressure vessel 42 operates in conjunction with a ball valve 36 and a water pressure regulator 48, each upstream from the location of the pressure vessel 42. Preferably, the pressure vessel 42 is a precharged water well tank, Model 4P835, distributed by the previously mentioned Dayton Electric Manufacturing Company, however, other pressure vessels can be employed.

Continuing to refer to FIG. 1, the ball valve 36 is located upstream from the pressure vessel 42 in the embodiment. The ball valve 36 is preferably electrically actuated to allow for automated control of water flow and pressure levels in the unit 100. Although other valves may be used, a preferred ball valve 36 is the Asahi America Electromni Low-Cost 1" electrically activated ball valve.

Still referring to FIG. 1, after passing through the ball valve 36 in the invention embodiment, the water being treated flows through another set of cartridge filters 38. In the preferred arrangement, the cartridge filters are a set of 5 µ cartridge filters. More preferably, three 5 µ filters are employed in flow parallel. Preferred cartridge filters 38 employed in the parallel array are BETAPURE® 5 µ filter cartridges contained in CUNO Model 1M2 industrial filter housings, each available from CUNO Inc., previously mentioned. At this point in the flow of the water, the cartridge filters 38 remove additional particles from the water. Other filters, suitable to remove particulates from the water, could be employed as the cartridge filter 38.

Continuing to refer to FIG. 1, in the embodiment, water flowing from the cartridge filters 38 is mixed with ozone off-gas 402 from the ozone contact chamber 10. The ozone off-gas 402 contacts with the water from the cartridge filters 38 and flows along with the water into a second granular activated carbon filter 40. This second GAC 40 is preferably of the same specifications as the first GAC 14, including the granular activated carbon media, even though alternatives are also possible here. At this second GAC 40, the water passes over the granular activated carbon bed of the second GAC 40 for removal of additional total organic carbons and volatile organic carbons which are adsorbed on the granular activated carbon media. The ozone off-gas 402 mixed with the water prior to entry to the second GAC 40 is useful in extending the life of the granular activated carbon media of the second GAC 40. The ozone off-gas 402 oxidizes materials that are adsorbed onto the granular activated carbon, performing an ongoing rejuvenation of the granular activated carbon media of the second GAC 40. The ozone off-gas 402 after passing with the water over the granular activated carbon is then collected from within the second GAC 40 and directed as an off-gas 404 for destruction.

Still referring to FIG. 1, in the invention embodiment, water flowing from the second GAC 40 flows to a water pressure regulator 48 which, as previously mentioned, serves in conjunction with the water pressure vessel 42 and ball valve 36 to maintain appropriate water and pressure levels at previous water flow locations of the unit 100. The pressure regulator 48 preferably serves to maintain a pressure in the range of from about 20 psi to about 40 psi at the downstream portions of the unit 100. Preferably, the water pressure regulator 48 is a PLAST-O-MATIC™ Style B, Series RVT, 1 ½" (Size No. 15), Model 4526-0, PVC, Viton trim valve, although other means of pressure regulation may be employed.

Further still referring to FIG. 1, a portion of the water 310 exiting the second GAC 40 flows to a chlorine generation unit 58 in the embodiment. The chlorine generation unit 58 preferably comprises a chemical solution tank with float valve level regulator, a chlorine cell, a DC power supply, a saltwater sump pump, and a peristaltic chlorine dosing pump (not detailed in FIG. 1). The portion of the water 310 flows to the chemical solution tank wherein the level is regulated by the float valve level regulator. The chlorine cell is powered by the DC power supply. The salt water sump pump circulates the water 310 across the chlorine cell. The chlorine cell generates liquid chlorine (i.e., Sodium Hypochlorite) from the water according to the formula:

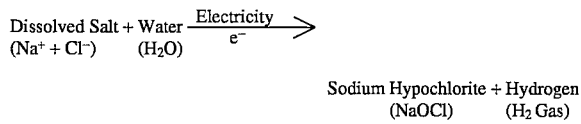

The liquid chlorine is fed from the chlorine generation unit 58 via the peristaltic chlorine dosing pump. In a preferred embodiment, the chemical solution tank is a Mec-O-Matic brand No. 2P307 available from Dayton Electric Manufacturing Company, previously mentioned. The tank is equipped with a liquid level monitor to check the liquid level in the tank without opening the lid. The monitor operates with a float valve, preferably a 3 GPM Watts Regulator model also available from Dayton Electric Manufacturing Company, to regulate liquid level in the tank. The chlorine cell is preferably a LECTRANATOR® automatic chlorine system available from Lectranator of Fort Lauderdale, Fla. The DC power supply of the chlorine system provides 5.5 Amps, 230 VDC, Maximum with power in of 115 VAC, 50/60 Hz, 2.5 Amps or 23 VAC, 50/60 Hz, 1.3 Amps. The saltwater sump pump employed is preferably an epoxy-encapsulated magnetic driven saltwater pump, Model No. 2P875 available from Dayton Electric Manufacturing Company. The peristaltic chlorine dosing pump is preferably a Mec-0-Matic brand multi-purpose peristaltic pump, Model No. 2P305, also available from Dayton Electric Manufacturing Company. Alternative means for chlorine generation may also be employed.

Continuing to refer to FIG. 1, in the embodiment, water passing from the water pressure regulator 48 enters another set of cartridge filters 50, preferably three 5 μ cartridge filters in flow parallel. The preferred cartridge filters 50 more preferably meet the same specifications as those previously described with respect to the description of cartridge filters 38. Other filtering mechanisms could be employed. If desired for further water treatment, water may be flowed through an optional reverse osmosis unit 52 prior to proceeding to a chlorine contact chamber 54. The optional reverse osmosis unit 52 will later be discussed in particular detail.

Still referring to FIG. 1, after flowing through the set of cartridge filters 50 (and the reverse osmosis unit 52, if present) the water being treated flows to a chlorine contact chamber 54 in the embodiment. The chlorine contact chamber 54 is preferably a STA-RITE® System 3 High Rate Sand Filter vessel, Model S8S70, available from Sta-Rite Industries, Inc., previously mentioned. Nevertheless, other suitable contacting equipment could be employed. At the chlorine contact chamber 54, the water is contacted with liquid chlorine 406. The chlorine 406 allows for final disinfection of the water. In the chlorine contact chamber 54, the ORP level of the water is monitored. Chlorine 406 slurry is added by the peristaltic chlorine dosing pump to maintain a chlorine residual in the water being dispensed. In the preferred embodiment, the water is mixed with chlorine for four minutes contact time and then dispensed. Further in the preferred embodiment, the chlorine contact chamber 54 is maintained at an operating pressure ranging from about 5 psi to about 40 psi.

Further referring to FIG. 1, it is of note that, as described in connection with the above discussion of the prior technology, chlorine and humic waste combine to form trihalomethanes, proven carcinogens. Most mobile water treatment systems of the prior technology add chlorine much earlier in the treatment process. The result is formation of trihalomethanes. Once formed, trihalomethanes are extremely difficult to remove from water. In the embodiment of the invention system and method, all humic materials are cleaned from the water before adding chlorine (i.e., by using the $O_3$ contact, granular activated carbon filtration, and conventional filtration), thereby preventing formation of trihalomethanes upon addition of chlorine to the water at the step of contacting the water with chlorine in the chlorine contact chamber 54.

Further referring to FIG. 1, in the embodiment, treated water exiting the chlorine contact chamber 54 is passed to another set of cartridge filters 56. This set of cartridge filters 56, like all the others, can be any suitable mechanism, however, it is preferably three 1 μ cartridge filters in parallel flow. More preferably, these filters are BETAPURE® 1 μ filter cartridges housed in CUNO Model 1M1 or 1M2 industrial filter housings, each available from CUNO Inc., previously mentioned. At the treated water 310 outlet of the unit 100, the treated water may be measured and tested. In the preferred embodiment, the treated water passes through a flow rotameter, preferably a 7830/7330 Series Free Standing Flowmeter distributed by King Instrument Company of the Huntington Beach, Calif. The treated water also preferably is tested for conductivity, pH, and ORP levels, more preferably by means of an ASI Conductivity Cell Part Number CT121008-10-T a Hard Bulb pH Electrode, and an ORP Electrode, each available from Analytical Sensors, Inc. The treated water exiting the unit 100 can also be regulated, preferably by a Hi-Temp Steam Solenoid Valve Model 2A199 available from Dayton Electric Manufacturing Company, although other suitable regulating means could be employed. Treated water 310 exiting the cartridge filters 56 can meet World Health Organization requirements for biological efficacy of potable water and can satisfy innumerable other standards which may apply in any particular instance.

Even further referring to FIG.1, as previously mentioned, in the embodiment, the water splits after the first GAC 14 with a portion of the water 314 flowing to recirculate. The portion of the water recirculated is flowed in path 314. The recirculated water 314 preferably flows through a check valve 28 which serves to prevent back-flow of the untreated water of the recirculated stream. The check valve 28 is preferably a Viton 1" low cost PVC check valve. The water 314 flowing through the check valve 28 for recirculation also preferably flows through a solenoid valve 30 that allows control of the recycle stream 314, as desired, to achieve appropriate mixing of the recirculated portion 302 at the inlet of the ozone contact chamber 10. The solenoid valve 30 is preferably a ¾" brass Hi-Temp Steam solenoid valve, Dayton Model 2A199, operated with a solenoid coil, Dayton Model 6X543, and a liquid level control, Madison Model M8000. Alternative equipment could be employed as check valve 28 and solenoid valve 30. In the embodiment, the solenoid valve 30 is operated in conjunction with the recycle ball valve 36, previously described, to obtain an appropriate recirculation rate to yield a desired ORP level of water exiting the ozone contact chamber 10.

Still referring to FIG. 1, after flow through the solenoid valve 30, the recycle stream 314 is mixed with a recirculation stream 303 from the ozone contact chamber 10 in the invention embodiment. The mixed streams 303,314 flow to a venturi booster pump 32. The venturi booster pump 32 is preferably a POLARIS® Vac-Sweep pump, Model PB-4, available from Polaris of San Marcos, Calif., although other equipment could be employed. At the booster pump 32, ORP of the mixed streams 303,314 is sensed by an ORP sensing mechanism, preferably an ORP Electrode available from Analytical Sensors, Inc. of Houston, Tex. The ORP level sensed thereat is employed by the control system of the invention to regulate recycle by virtue of the solenoid valve 30 and ball valve 36.

Continuing to refer to FIG. 1, in the preferred embodiment of the invention, recirculated water 314 flow is regulated to obtain desired ORP levels at the booster pump 32 for mixed streams 303,314. In controlling the unit 100 in a preferred embodiment, an ORP level of 650 mV or greater is sought for treated water at the chlorine contact chamber 54. In the preferred embodiment, it is known that an ORP level of 200 mV or greater at the ozone contact chamber 10 will yield the desired ORP level of 650 mV or greater at the chlorine contact chamber 54. The preferred control arrangement for the unit 100 is to recirculate the entire water stream 314, as necessary, until a 200 mV or greater ORP level is sensed at the ozone contact chamber 10. When such an ORP level is sensed at the chamber 10, recirculation is discontinued. As hereinafter more fully discussed, the automated control of the preferred unit 100 achieves the desired recirculation described here.

Further referring to FIG. 1, in the invention embodiment, the venturi booster pump 32 pumps the mixed stream 303,314 to a venturi 34. At the venturi 34, ozone which has been generated by the on-board ozone generation unit 150 is mixed with the mixed streams 303,314 and fed via stream 302 to the inlet of the ozone contact chamber 10. The venturi 34 is preferably a Mazzei Injector, Model 1081, available from Mazzei Injector Corporation. Any mechanism which allows mixing of ozone with the mixed streams 303,314 may be employed as the venturi 34. At the inlet of the venturi 34, the mixed streams 303,314 preferably enter at a flow rate of about 10 GPM and a pressure of about 60 psi. The suction port of the venturi 34 sucks in ozone at a rate of preferably about 1 CFM under these operating conditions. The outlet stream from the venturi 34, which is water 302 for entering the ozone contact chamber 10, exits the venturi 34 preferably at a flow rate of about 10 GPM and a pressure of about 40 psi. Alternative flows and pressures may be suitable or appropriate.

Still referring to FIG. 1, in the embodiment, a closed-loop of water 312 flows to the ozone generation unit 150. The ozone generation unit 150 serves to generate ozone at the system site. The ozone generation unit 150 preferably consists of an ozone reaction chamber 20 in which ozone is generated from the ambient air of the particular environment where the invention is being employed. Other ozone generation means 150 maybe suitable. Ozone which has been generated at the ozone reaction chamber 20 mixes with mixed recycle and recirculation streams 303,314 at the venturi 34, as previously described. This serves to provide ozone to the ozone contact chamber 10 where the ozone is mixed with the water flowing to the inlet of the ozone contact chamber 10.

Continuing to refer to FIG.1, in the embodiment, the ozone off-gas 402 from the ozone contact chamber 10, as previously mentioned with respect to the second GAC 40, again enters the water being treated prior to the second GAC 40. At this point, the entry of the ozone off-gas 402 serves to rejuvenate the granular activated carbon media in the second GAC 40 by oxidizing substances adsorbed onto the media. This rejuvenation effect obtains longer active life of the granular activated carbon media.

Further still referring to FIG. 1, in the invention embodiment, the ozone generation unit 150 is seen to include an air compressor tank 18 for storing air under pressure. The air compressor tank 18 is preferably a Stationary ASME Code Air Tank, 15 gal. or greater capacity, Dayton Model 5Z358, although others may be employed. The air is pressured by an air compressor 22, preferably a GAST Model SHCD-78-M500X, associated with the tank 18. The tank 18 is equipped with a condensate purge valve 24, preferably a SpeedAire Model No. 6Z948, for dispelling condensation from the system. The air compressor 22 is controlled by a pressure switch 23, preferably a Furnas Model No. 69MB6.

Still referring to FIG. 1, the outlet compressed air from the air compressor 22 preferably ranges from about 60 psi to about 100 psi. The compressed air from the air compressor tank 18 flows, preferably at a rate of about 1 CFM, to an air conditioning unit, including, for example, an air cooler apparatus 17, air drying apparatus 19, and coalescing apparatus 16, each associated with the ozone generation unit 150. Other flows and pressures may be suitable. Additionally, the air conditioning unit may consist of other equipment.

Still referring to FIG. 1, in the embodiment, the compressed air flowing to the ozone generation unit 150, after conditioning, regulation, and measurement, passes to the ozone reaction chamber 20 where the air is preferably at a pressure of from about 9 psi to about 12 psi. The ozone reaction chamber 20 is preferably operated at about 13,000 volts high voltage discharge across the air gap where the ozone is created. Other voltages may be suitable. Electricity is supplied to the ozone reaction chamber 20, for example, from a high voltage transformer, preferably an ORAM Model No. TU 1-13.5-1.1, that receives electricity from the gas-powered electric generator of the unit 100. The transformer may require a cooling fan, also operable by power from the unit 100 generator. The ozone reaction chamber 20, in the preferred embodiment, is a shell and tube bundle in which high voltage electrical discharge across an air gap causes oxygen to be converted to ozone. The shell provides a water cooling jacket around the ozone reaction chamber 20 within the tube bundle, so the reaction is very cool. Water is supplied to the cooling jacket via stream 312. Contact time of the water 312 within the ozone reaction chamber 20 is preferably about four minutes, although other contact times may be employed.

Continuing to refer to FIG. 1, at the air cooler apparatus 17 of the invention embodiment, the compressed air is cooled, preferably to a range of from about 60° F. to about 100° F. Although a variety of cooling apparatus and methods could be employed, the air cooler apparatus 17 is preferably a Water-Cooled Aftercooler, Model 5Z625 available from SpeedAire, previously mentioned, which Aftercooler is a small shell and tube exchanger. The air is cooled via the air cooler apparatus 17, for example, by water circulated in the apparatus 17 in the preferred embodiment. The water serving to circulate may be a closed-loop stream 312 of FIG. 1 which, as illustrated in FIG. 1, first flows through an ozone reaction chamber 20 as later herein discussed prior to flowing through the air cooler apparatus 17. A hydronic cooling pump 26 is preferably employed to circulate the stream 312, however, other equipment may be employed.

Further referring to FIG.1, after passing through the air cooler apparatus 17, the air, in the invention embodiment, is passed to the particulate filter (not shown in detail in FIG. 1). The particulate filter removes particles and bulk moisture condensate. The air is then passed to an oil coalescing filter (not shown in detail in FIG. 1) where hydrocarbons to 0.01 µ are removed. The air is then passed to the air drying apparatus 19, preferably a Heatless Desiccant Twin Tower Dryer, DE Series, Model DEO, available from Wilkerson Corporation, Englewood, Colo. A pressure switch (not shown) is preferably located between the air drying apparatus 19 and the air cooler apparatus. The pressure switch can serve to alarm the programmable logic controller (hereinafter discussed) in the event proper air pressure (e.g., 50 psi) is not available at the air drying apparatus 19. A preferred pressure switch is the Furnas Model 69WR5.

Further referring to FIG. 1, in the embodiment, the air passes from the air drying apparatus 19 to a coalescing apparatus 16. The coalescing apparatus 16 may take a variety of forms, however, the coalescing apparatus 16 is preferably a Compact Modular Coalescing Filter Model M16 equipped with a Filter Model F16B, each available from Wilkerson Corporation, previously mentioned. Air from the coalescing apparatus 16 is dried and cooled to preferably about a minus 60° F. dewpoint. This completes the air conditioning unit of the ozone generation unit 150. The air conditioning unit, as necessary, is equipped with electrical connections for receiving power generated by the gas-powered electric generator of the unit 100, previously described.

Continuing to refer to FIG. 1, after conditioning, the air to the ozone generation unit 150 travels to an ozone reaction chamber 20 in the invention embodiment. Prior to entering the ozone reaction chamber 20, the air may be subjected to certain steps, for example, regulation and measurements. In a preferred embodiment, the air is regulated and measured via an air control apparatus 21. The air control apparatus 21 may include, for example, an air filter and pressure regulator, a flow switch coupled with a delay timer, and an air flow rotameter. A preferred air filter and pressure regulator is the SpeedAire Model 2Z436A. The flow switch is preferably a Malema Model M-50/55 Series available from Malema Engineering Corporation of Pompano Beach, Fla. The associated delay timer is preferably a Dayton Model 5X830F Time Delay Relay. A preferred air flow rotameter is the RATEMASTER® Flowmeter distributed by Dwyer Instruments, Inc. of Michigan City, Ind. All this equipment, to the extent necessary, is also powered by the gas-powered electric generator of the unit 100, as previously described.

Further referring to FIG. 1, in the invention embodiment, closed-loop water stream 312 passes through the ozone reaction chamber 20 and then on to pass through the air cooler apparatus 17. Between the chamber 20 and cooler apparatus 17, however, the water 312 may, as is preferable, pass through a restrictor orifice, cooling coils, cool water reservoir, cooling pump, water flow meter, and flow switch (all not shown). The restrictor orifice prevents backflow of water 312 flowing to the cooling coils. Preferred cooling coils may be obtained from SpeedAire Model No. 5Z757 or 5Z758. The cooling coils preferably cool the water 312, flowing at about 2 GPM at 20 psi, down to about 10° F. below ambient temperature. A cooling fan, for example, as is preferable, a Dayton Axial Fan Model 4C688, may be employed in connection with the cooling coils to obtain the desired water cooling effect. Cooled water from the cooling coils can be stored in the cool water reservoir. A cooling pump, for example, preferably a TEEL Model Z1015, may be employed to pump cooled water from the reservoir to the air cooler apparatus 17 to complete the cooling water 312 flow loop. Prior to reaching the air cooler apparatus 17, the pumped water 312 may pass through a water flow meter, preferably a RATEMASTER® Flowmeter Model RMC available from Dwyer Instruments, Inc., previously mentioned. The pumped water 312 also may pass through a corrosion-resistant flow switch, preferably a Poly-Pro Model 6952. Alternative and/or additional equipment may be employed.

Figure 2:
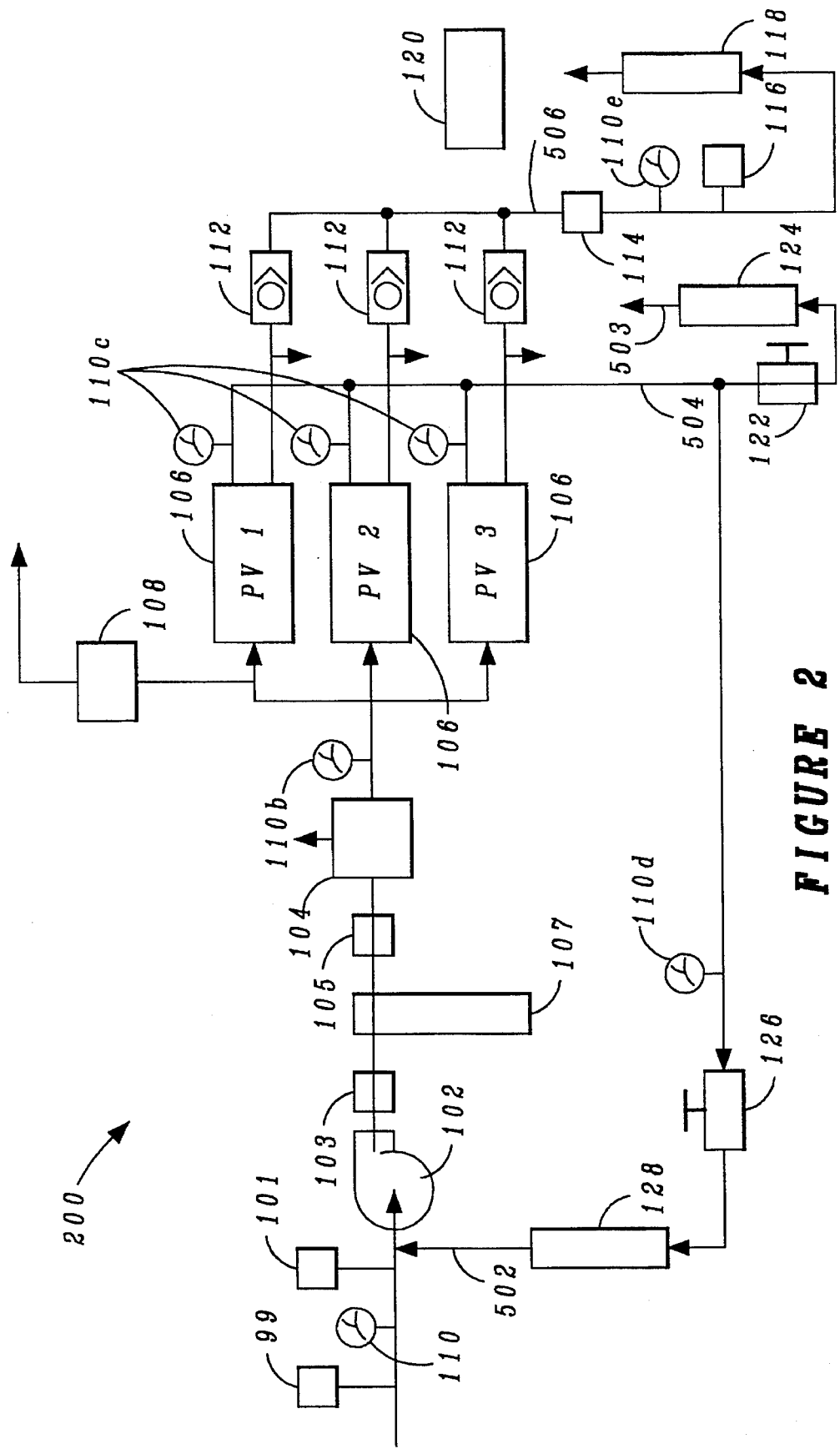
FIG. 2. is a simplified, illustrative, flow-diagram of the system and method of the desalination (or reverse osmosis) unit of the present invention.
Figure 3A:
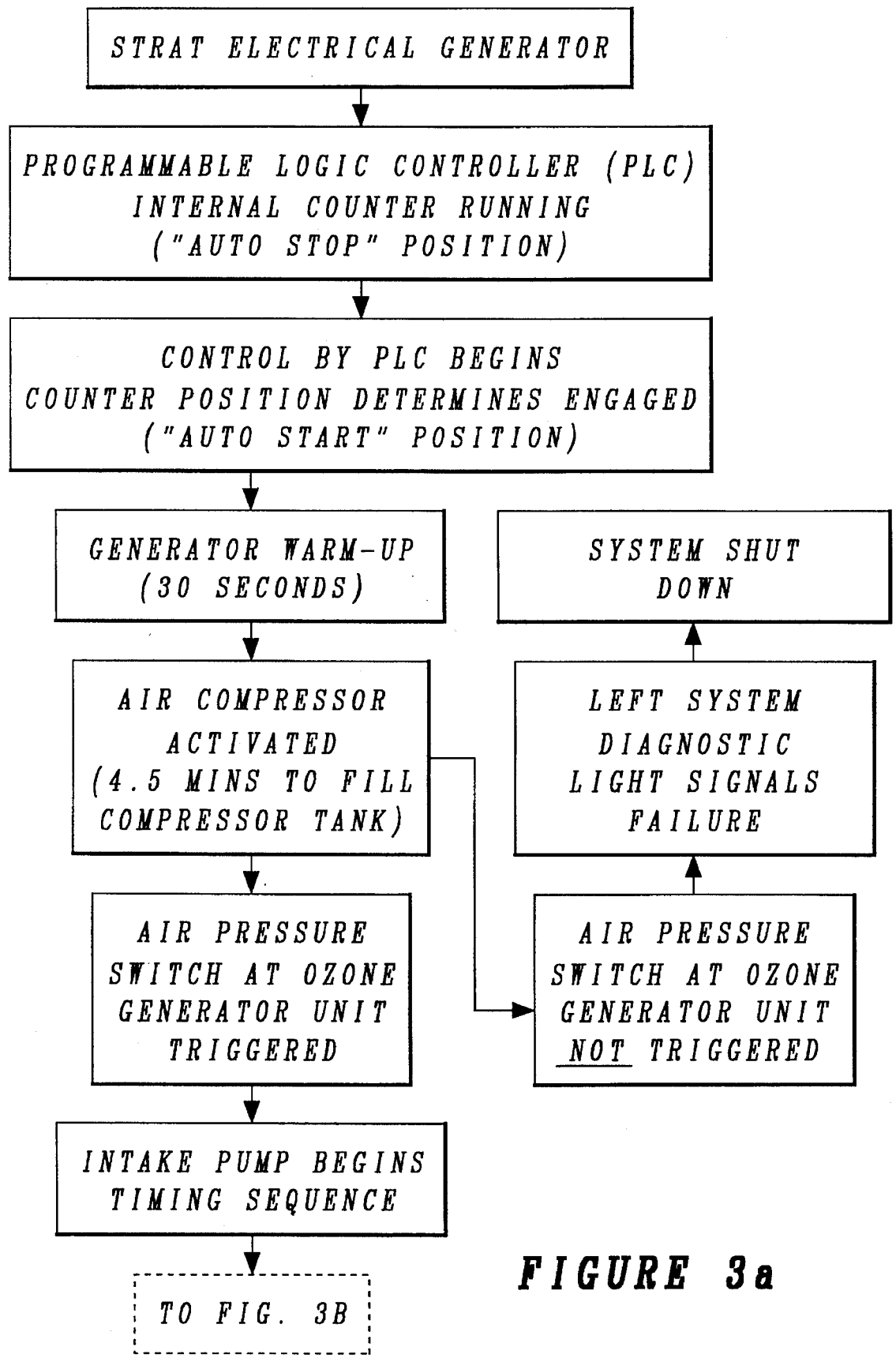
FIG. 3. is a flow diagram of a preferred embodiment of the programmable logic controller (PLC") control method of the present invention.
Figure 3B:
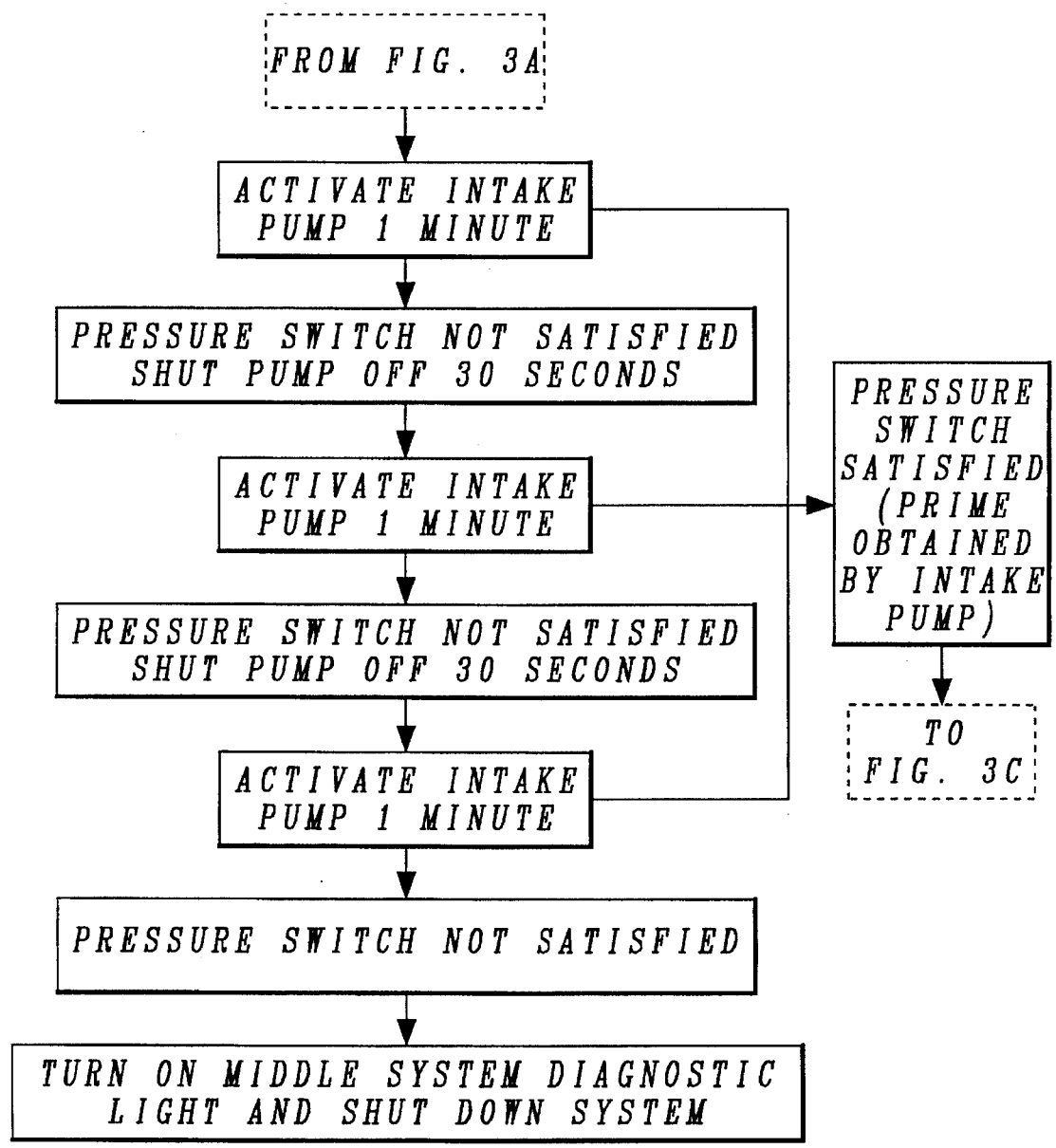
Figure 3C:
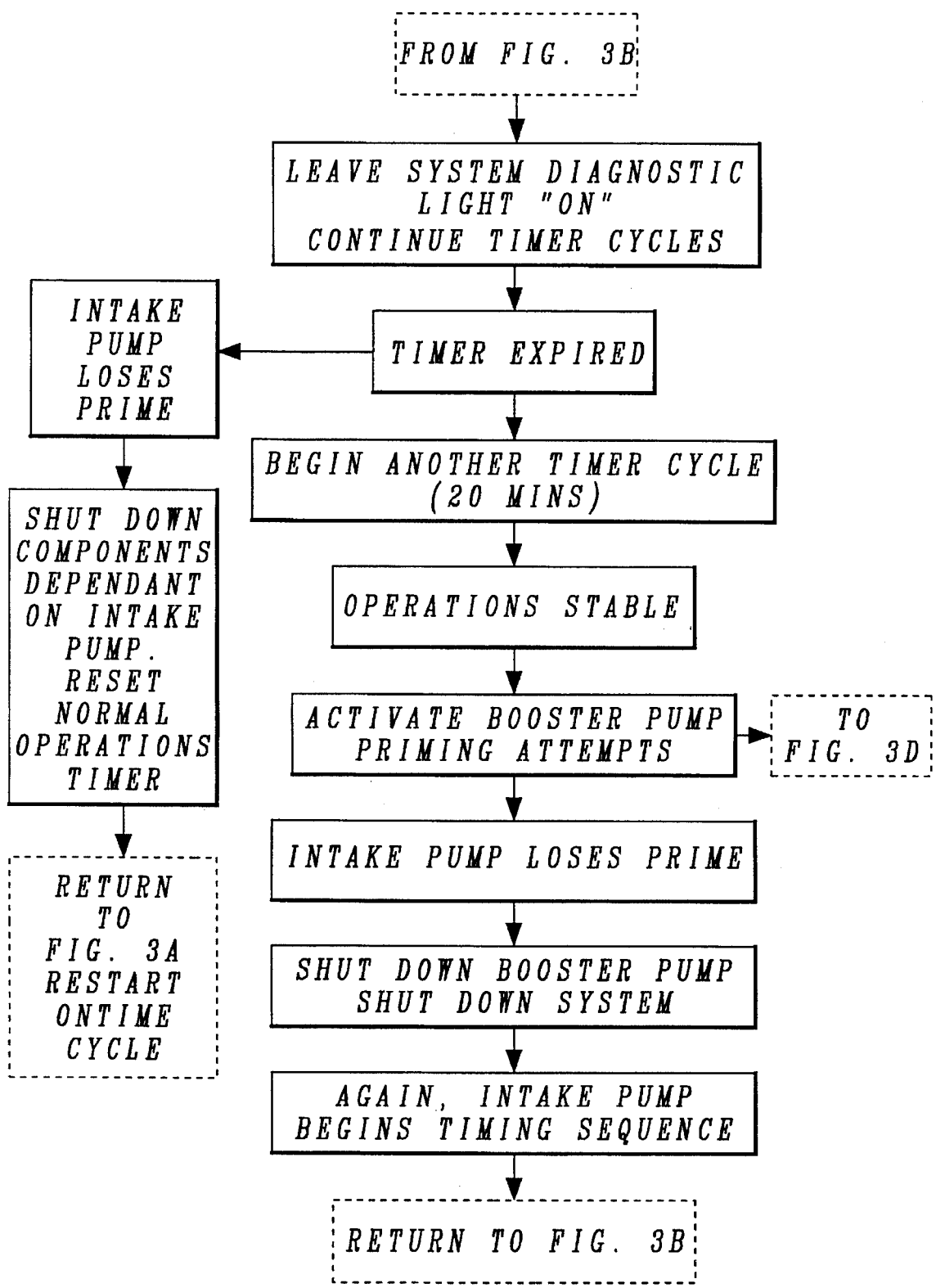
Figure 3D:
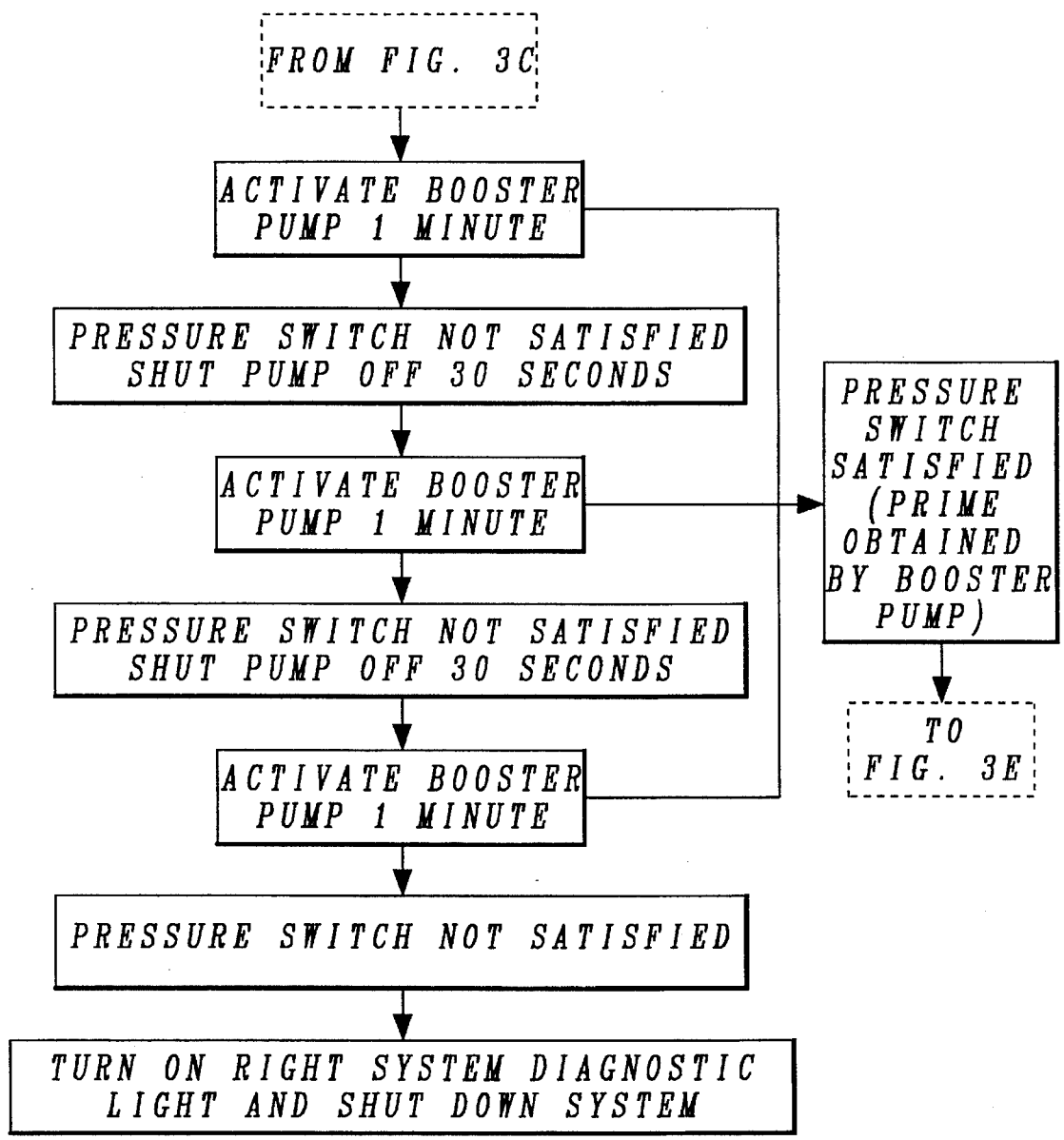
Figure 3E:
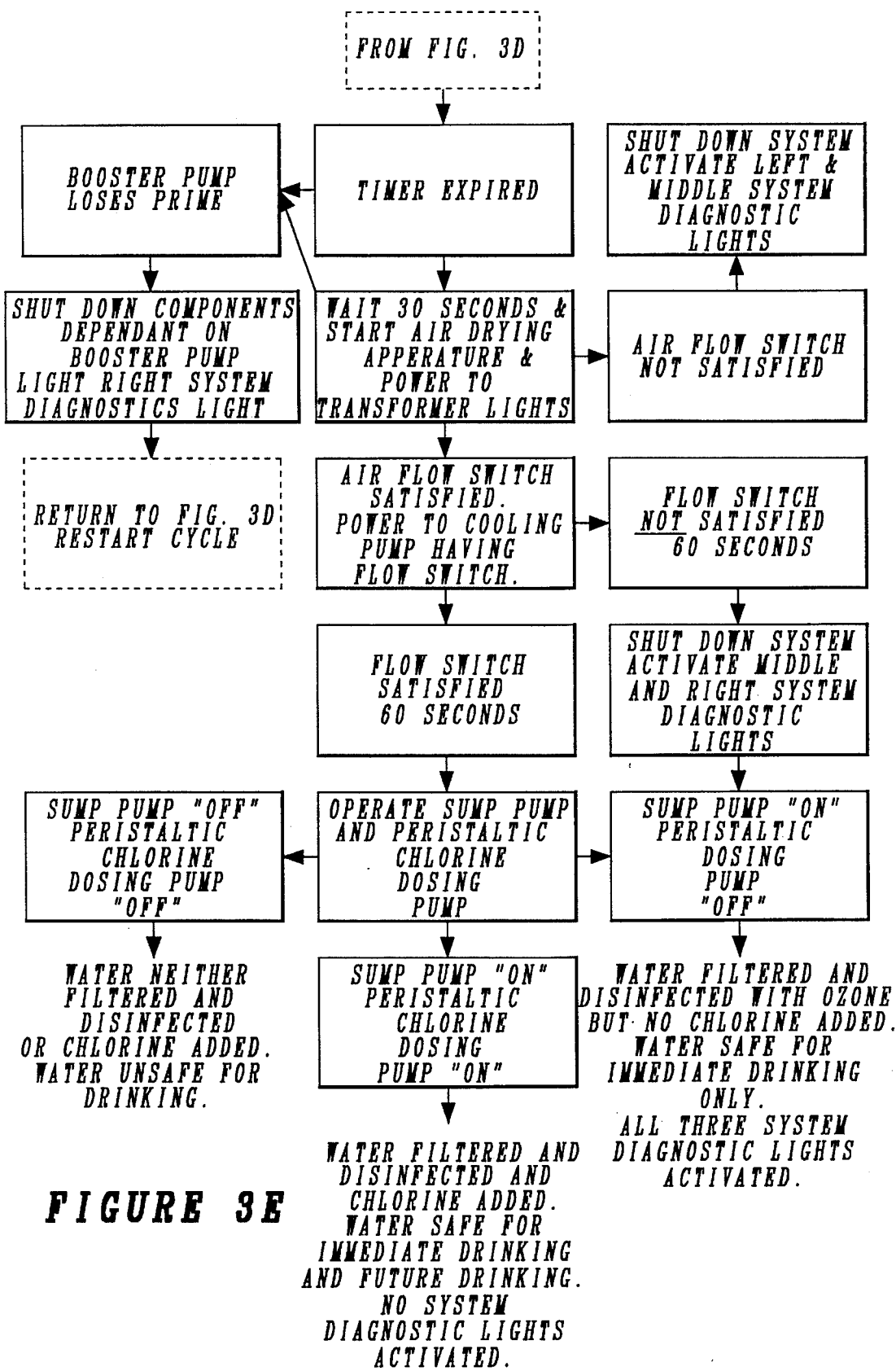

Now referring to FIG. 2, the desalination (or reverse osmosis) unit 200 of an embodiment of the invention is illustrated. The reverse osmosis unit 200 may be employed with the bactericidal unit 100 when the water is brackish or sea water. The reverse osmosis unit 200, when used, is employed primarily to remove dissolved substances, such as salts, from the water prior to passage from the unit 100. As previously described, when used, the reverse osmosis unit 200 in the embodiment receives the water being treated after passage from the cartridge filters 50 of the unit 100 and returns water from the reverse osmosis unit 200 to the inlet of the chlorine contact chamber 54 of the unit 100.

Still referring to FIG. 2 in the invention embodiment, water fed to the reverse osmosis unit 200 first passes to a high pressure pump 102. Note that prior to passing to the high pressure pump 102 the inlet water to the reverse osmosis unit 200 is, in the embodiment, mixed with a recirculated stream 502 as will hereinafter be more particularly described. The high pressure pump 102 increases system pressure, for example, preferably to about 175 psi for brackish water and up to about 400 psi for sea water. In order to reach the pressure desired for sea water approaching 400 psi, the high pressure pump 102 must be replaced, for example, with a positive displacement pump. A preferred high pressure pump is the gas-powered B1 ½ XQBS Fire Pump Engine Driven Centrifugal Pump and gas engine therefor available from Berkeley Pump Company, Berkeley, Calif. The high pressure pump 102 may be driven, for example, by an 11 hp gas powered engine (not shown in detail) preferably manufactured by Briggs & Stratton. When a positive displacement pump is instead employed, a preferred pump is the Teel Model No. 2P417 positive displacement high-pressure plunger pump.

Still referring to FIG.2, prior to the pump 102, the water in the invention embodiment may pass through a series of valves 99, gage 110a, detector 110, and coupling (not shown). For example, in a preferred embodiment, dual electric ball valves 99, each preferably Asahi/America Electronmi Low-Cost Actuated Ball Valves, may serve for shutting "on" and "off" flows to the reverse osmosis unit 200. Additionally in a preferred embodiment, the water may pass through a flow detector 110, more preferably an AQUALARM® Liquid Flow Detector Model 200 available from Aqualarm, Chula Vista, Calif. Other flow controls and methods could be employed.

Still referring to FIG. 2, from the high pressure pump 102, the water in the embodiment flows at a pressure in the range of from about 150 psi to about 1000 psi. The water may again pass through a series of ball valve 103, high pressure filter 107, and ball valve 105, or other mechanisms. In a preferred embodiment, the high pressure filter 107 comprises parallel high pressure cleanable cartridge filters, preferably 0.5 µ size, and more preferably CUNO Model CT102 Cartridge Filter Housings and BETAPURE® Z Grade Filter Cartridges, each available from CUNO, Inc., previously mentioned. The ball valves 103,105 are preferably located at the inlets and outlets to the cartridge filter housings and allow shut-off of flows to the filter 107 to allow for cleaning. Preferred ball valves 103,105 are SpeedAire Stainless Steel Ball Valves, Grainger Stock No. ZPZ84.

Still referring to FIG. 2, in the invention embodiment, the water then may pass to an off-gas discharge 104. Any gas resulting from the pressure up by the high pressure pump 102 is discharged from the system at that point. Note that the system includes a variety of pressure gages 110*a–e* which serve to give the operator pressure readings throughout the reverse osmosis unit 200.

Further still referring to FIG. 2, in the 20 embodiment, the water then flows to a series of high pressure reverse osmosis vessels 106. These high pressure reverse osmosis vessels 106 include means, for example, reverse osmosis membranes (not detailed), to accomplish the reverse osmosis treatment process. A preferred reverse osmosis vessel 106 is the HYDRANAUTICS™ high-strength pressure tube assembly with Hydraclam® collars, available from Hydranautics, Inc., San Diego, Calif., although other vessels may be used. A preferred reverse osmosis membrane element is the CPAZ element from Hydranautics, Inc. In operation of the reverse osmosis treatment process employing membrane elements, a low concentration solvent stream 506 of water and a high concentration residual stream 504 of water exit each of the reverse osmosis membranes as water is input to the vessels 106. Note that prior to entering the high pressure reverse osmosis vessels 106 the water flow path includes a safety pressure relief valve 108 which serves as a safety mechanism to prevent excessive pressure buildup. The water entering the vessels 106 is at a pressure approximately that output by the high pressure pump 102. As the water passes through the membranes, the pressure of the solvent stream 506 is reduced, in the embodiment, to a pressure in the range of from about 5 psi to about 50 psi. The residual stream 504 will, in the embodiment, be restrained by valves 122,126 to maintain a high pressure approaching that of the water input to the vessels 106. Preferred valves 122,126 are the SpeedAire Stainless Steel Ball Valves previously discussed. Note that the residual stream 504 passes to recirculate to the inlet of the high pressure pump 102 or to be dispelled from the system 503.

Still referring to FIG. 2, in the invention embodiment, the recirculated portion of the residual stream 504 is held at a sufficient pressure by valve 126 and also passes through flow meter 128 prior to entry to the inlet of the high pressure pump 122. The other portion of the residual stream 504 passes through valve 122 and flow meter 124 before exiting the system. The water 503 exiting the system at this point is very high in total dissolved solids and is dispelled from the system.

Continuing to refer to FIG. 2, in the invention embodiment, the solute stream 506 from the high pressure reverse osmosis vessels 106, which has dropped to a pressure of about 50 psi or less, travels through check valves 112 before flowing to an ORP meter and a conductivity meter, collectively meters 114 in FIG. 2. At the ORP and conductivity meters 114, the treated water stream 506 is tested for ORP level and conductivity level so that the system may be properly controlled to treat the water, as hereinafter more particularly described. The treated water 506 then flows from the reverse osmosis unit 200 through a flow meter 118 and back into the bactericidal unit 100 prior to entry into the chlorine contact chamber 54 (see FIG. 1). In the preferred embodiment the reverse osmosis unit 200 can recover at least about 50% of the water delivered thereto as product water 506 for return to the bactericidal unit 100 and the rest of the water 503 is discharged carrying away rejected solids. Other water recovery rates may be possible and the invention should not be considered limited in this regard.

Now referring to FIG. 3 and FIGS. 1 and 2 in conjunction, process control by the programmable logic controller of the embodiment of the invention, and, in particular, the preferred embodiment, may be understood. As previously described, the invention system and method in the embodiment is a self-contained operation. Further, the invention embodiment described is sufficiently small to be transportable and operable for significantly long periods of time without addition of externally supplied substances and equipment. The invention embodiment additionally is completely controlled by a microprocessor 60 and operates by electrical power, except for the high pressure pump 102 in the preferred embodiment, which is a direct drive gasoline powered pump. Power to all other aspects of the invention is provided by the system's electrical generator previously described. The invention is controlled by a programmable logic controller. The programmable logic controller is programmed to monitor and perform the tasks that an operator would otherwise perform on a regular basis. In fact, because of capabilities of the programmable logic controller, the programmable logic controller can optimize operations. Even further, the programmable logic controller of the invention can help prevent system damage in certain instances and can allow for dependability of the invention, including dependability and consistency of product water quality. The programmable logic controller of the preferred embodiment, thus, can provide for easy and safe operation of the complex system and method.

Continuing to refer to FIG. 3 and FIGS. 1 and 2 in conjunction, although the invention may be operated as an automated unit controlled by the programmable logic controller, a preferred embodiment of the invention allows for alternative manual operation. In order to manually operate the preferred embodiment, for example, in the event of failure of the programmable logic controller or for other reasons, the embodiment is switched by an operator to manual mode. All switches of the system controlled by the programmable logic controller are double poled. When operating in manual mode, the operator can, therefore, manually operate the embodiment. All controls, except for system diagnostics, are workable when in manual mode.

Still referring to FIG. 3 and FIGS. 1 and 2 in conjunction, the programmable logic controller operation for automated operation of the embodiment may be described. The programmable logic controller receives power when the generator is started. At that point, a mode selector switch is turned to the "AUTO" position. System control operations by the programmable logic controller then begin when an "AUTO STOP/AUTO START" switch is turned to the "AUTO START" position. An internal counter of the programmable logic controller used for an intelligent stop function thereof is constantly running when the programmable logic controller receives power, but the "AUTO START/AUTO STOP" switch is in the "AUTO STOP" position. The position of this counter when the switch is turned to "AUTO START" will determine when a running light of the system is engaged. After the running light is activated, the programmable logic controller waits for 30 seconds to allow the system electric generator to warm up in preparation for the current demands of the system components.

Still referring to FIG. 3 and FIGS. 1 and 2 in conjunction, in the invention embodiment, when the generator warm-up timer is satisfied, the compressor 22 is then activated. The compressor 22 is allowed 4.5 minutes to fill the compressor tank 18 with compressed air. By the end of this 4.5 minutes, the air pressure switch 23 is triggered for operations to continue. If this switch 23 is not triggered after the 4.5 minutes waiting period, a SYSTEM DIAGNOSTIC light, for example, preferably a three light panel, will register a failure by turning on a left light only and shutting down the system.

Still referring to FIG. 3 and FIGS. 1 and 2 in conjunction, after the compressor 22 cycling period is over and the pressure switch 23 has been triggered, the intake pump 6 begins its timing sequence in the embodiment. The pump 6 then activates, pumping water to the unit 100. The pump 6 has an initial period of one minute to gain prime and satisfy a pressure switch (not detailed) that communicates the priming status to the programmable logic controller. If this initial priming try of the pump 6 is unsuccessful, the programmable logic controller shuts the pump 6 off for 30 seconds to allow the pump 6 to cool off. After this 30 seconds, the programmable logic controller activates the pump 6 for another one minute try to achieve prime and satisfy the pressure switch. If this attempt fails, the programmable logic controller shuts the pump 6 off for another 30 second cooling period. When the second cooling period is ended, the programmable logic controller activates the pump 6 for a final one minute priming attempt. If this final priming attempt is unsuccessful, the programmable logic controller turns on a middle SYSTEM DIAGNOSTIC light, and shuts the system down.

Continuing still to refer to FIG. 3 and FIGS. 1 and 2 in conjunction, if the pump 6 achieves prime on any of the priming attempts, the programmable logic controller of the embodiment leaves a SYSTEM DIAGNOSTIC light on but continues the timing cycles described above. If the pump 6 has achieved prime and the timer for the final try has expired, the programmable logic controller begins another timer. This timer expires 20 minutes after the final attempt, and it is used to mark when operations of the system should be stable. If the pump 6 achieves prime during any other attempts but loses pressure after the timers for the attempts have been exhausted and before the normal operations timer has expired, the programmable logic controller illuminates the middle SYSTEM DIAGNOSTIC light and shuts the system down. If the pump 6 loses prime after the normal operations timer has expired, the programmable logic controller shuts down all components dependent upon the intake pump 6, resets the normal operations timer, and begins the intake priming attempts again.

Continuing to refer to FIG. 3 and FIGS. 1 and 2 in conjunction, in the invention embodiment, if the pump 6 gains prime during any other three prime attempts, the pump 6 remains activated and the programmable logic controller waits for 30 seconds and, then, activates the booster pump 32 priming attempts. The booster pump 32 operation is dependent upon the operation of the intake pump 6. The programmable logic controller does not allow the booster pump 32 to operate if the intake pump 6 has lost prime. The booster pump 32 has a one minute on, 30 seconds off, one minute on, 30 seconds off, one minute on, priming attempt cycle like the intake pump 6. A pressure switch (not detailed) communicates with the programmable logic controller to register booster pump 32 prime. The booster pump 32, however, does not have a chance to regain prime after its timing cycle is exhausted. If the booster pump 32 fails to achieve prime by the time the timers for the last one minute try have expired, the programmable logic controller shuts the system down and lights the SYSTEM DIAGNOSTIC light on the right side. If the booster pump 32 achieves prime, maintains it past the expiration of the last timer, and then loses prime, the programmable logic controller shuts the system down and lights the SYSTEM DIAGNOSTIC light on the right side. However, since the booster pump 32 is dependent upon the intake pump 6 status, the entire priming cycle resets if the intake pump 6 loses prime within its priming attempts. This includes a restart of the intake priming attempts if the intake pump 6 loses prime during normal operations.

Further still referring to FIG. 3 and FIGS. 1 and 2 in conjunction, if the booster pump 32 achieves prime during any of the priming attempts, the programmable logic controller in the invention embodiment waits for 30 seconds and then activates the air drying apparatus 19. The air drying apparatus 19 is turned off if the booster pump 32 loses prime during the attempt cycle. When the air drying apparatus 19 is activated, the programmable logic controller also directs power to the high voltage transformer (not detailed) of the ozone generation unit 150. Power is routed to the high voltage transformer through an air flow switch of the air control apparatus 21. The air control apparatus 21 relays information to the programmable logic controller and through the delay timer associated with the air control apparatus 21. If the air flow switch is not satisfied for 30 seconds while the air drying apparatus 19 is on, the programmable logic controller shuts the system down and activates the left and middle SYSTEM DIAGNOSTIC lights.

Still referring to FIG. 3 and FIGS. 1 and 2 in conjunction, in the invention embodiment, the relay controlling the air drying apparatus 19 also sends power to the closed loop cooling pump (not detailed). The programmable logic controller monitors the status of the cooling pump through a flow switch (not detailed). If this flow switch is not satisfied for 60 consecutive seconds while the air drying apparatus 19 is on, the programmable logic controller shuts the system down and activates the middle and right SYSTEM DIAGNOSTIC lights.

Still further referring to FIG. 3 and FIGS. 1 and 2 in conjunction, in the embodiment of the invention, the programmable logic controller also monitors the operating status of the saltwater sump pump of the chlorine generation unit 58 and the peristaltic chlorine dosing pump also of the chlorine generation unit 58. If the saltwater sump pump is on and the peristaltic chlorine dosing pump is off, the water dispensed from the system is filtered and disinfected with ozone but no chlorine has been added for residual biocide effect. This water is safe for immediate drinking, but cannot be stored for later consumption. When this situation occurs, the programmable logic controller activates all three SYSTEM DIAGNOSTIC lights. If no SYSTEM DIAGNOSTIC lights appear on, water dispensed from the unit 100 is filtered and disinfected with ozone, and chlorine has been added to accomplish the residual biocide effect. This dispensed water is both safe for drinking immediately and in the future when properly stored.

As is clearly seen, the present invention provides significant improvements and advantages in the technology. The present invention is believed to be especially effective when manufactured and employed as described herein, however, those skilled in the art will readily recognize that numerous variations and substitutions may be made in the device and method and its use, steps, and manufacture to achieve substantially the same results achieved by the embodiments and in particular the preferred embodiment expressed and described herein. Each of those variations is intended to be included in the description herein and forms a part of the present invention. The foregoing detailed description is, thus, to be clearly understood as being given by way of illustration and example only, the spirit and scope of the present invention being limited solely by the appended claims.

What is claimed is:

1. A system for purifying non-potable water to make said water potable, comprising:

an intake pump for bringing said water into said system;

a first filter, connected to said intake pump, said water passing through and being filtered by said first filter;

an ozone contact chamber, connected to said first filter, said water passing through said ozone contact chamber and being contacted with ozone in said ozone contact chamber;

a second filter, connected to said ozone contact chamber, said water passing through and being filtered by said second filter;

a first granular activated carbon filter, connected to said second filter, said water passing through said first granular activated carbon filter;

a third filter, connected to said first granular activated filter, said water passing through and being filtered by said third filter;

a second granular activated carbon filter, connected to said third filter, said water passing through said second granular activated carbon filter;

a fourth filter, connected to said second granular activated carbon filter, said water passing through and being filtered by said fourth filter;

a chlorine contact chamber, connected to said fourth filter, said water passing through said chlorine contact chamber and being contacted with liquid chlorine in said chlorine contact chamber; and means for desalinating said water, said means located connected to said fourth filter and upstream from said chlorine contact chamber;

wherein at least one additional one of said filters includes granular activated carbon.

2. The system of claim 1, further comprising means for ozone generation, said generation means receiving water for purposes of cooling and said means for inputting generated ozone to said ozone contact chamber.

3. The system of claim 1, further comprising means for detecting a first oxidation reduction potential of said water at a select location of said system and recirculating at least some of said water from said ozone contact chamber back into said ozone contact chamber in response to said first oxidation reduction potential detected to obtain water from said system having a second oxidation reduction potential.

4. The system of claim 1, wherein said system is portable, self-contained and capable of substantially continuous operations for the purification of non-potable water.

5. The system of claim 4, wherein said system is fully automated and controlled by a programmable logic controller.

6. A method of purifying non-potable water by a system operable to make said water potable, comprising the steps of:

bringing said water into said system;

filtering said water by passing said water through a first filter;

contacting said filtered water with ozone;

filtering said water by passing said water through a second filter;

passing said water across a first granular activated carbon filter;

filtering said water by passing said water through a third filter;

passing said water across a second granular activated carbon filter and filtering said water by passing said water through a fourth filter;

contacting said filtered water with chlorine; and desalinating said filtered water.

7. The method of claim 6, wherein said steps are substantially continuously performed for the purification of non-potable water.

8. The method of claim 6, wherein said system is transportable.

9. The method of claim 6, further comprising the steps of generating ozone electrically across electrodes.

10. The method of claim 6, further comprising the steps of detecting a first oxidation reduction potential of said water at a select location of said system and recirculating at least some of said water from said ozone contact chamber back into said ozone contact chamber in response to said first oxidation reduction potential detected to obtain water from said system having a second oxidation reduction potential.

11. The method of claim 6, wherein said method is fully automated and controlled by a programmable logic controller.

12. The method of claim 6, further comprising the step of controlling other steps of said method by a programmable logic controller.

13. The method of claim 12, further comprising the steps of controlling said other steps of said method by a backup logic mechanism when said programmable logic controller fails.

14. The method of claim 13, wherein said steps of controlling by a programmable logic controller and controlling by a backup logic mechanism control said other steps in an identical manner.

15. A self-contained water purification system for generating potable water from non-potable water introduced into said system, said system comprising:

means for oxidizing, wherein said means for oxidizing treats said non-potable water by oxidizing organic substances in said non-potable water, disinfecting said non-potable water by destroying parasites, bacteria and viruses in said non-potable water, and causing coagulation of colloids in said non-potable water;

means for filtering said treated non-potable water, wherein said means for filtering filters said treated non-potable water to remove said oxidized organic substances, said destroyed parasites, bacteria and viruses, and said colloids, to provide potable water;

said means for filtering including granular activated carbon;

means for generating a biocide, wherein said means for generating is capable of producing a biocide from dissolved salts present in said filtered water; and means for desalinating said water.

16. The system of claim 15 wherein said system further comprises means for contacting said potable water with said biocide.

17. The system of claim 16 wherein said means for contacting is located downstream relative to said means for oxidizing and said means for filtering.

18. The system of claim 15 wherein said biocide is selected from the group consisting of chlorine, sodium hypochlorite, hydrogen peroxide, chlorine dioxide and ozone.

19. The system of claim 15, wherein said system is self-contained and capable of substantially continuous operations for the purification of non-potable water.

20. The system of claim 19, further comprising a wheeled trailer of the type which is capable of being towed by a vehicle, wherein said system is fully contained within said wheeled trailer.

21. The system of claim 15, wherein said system is fully automated and controlled by a programmable logic controller.

22. A method for generating potable water from non-potable water, said method comprising the steps of:
- introducing non-potable water into a self-contained water purification system comprising means for oxidizing, means for filtering, means for desalintaining and means for generating a biocide;
- oxidizing said non-potable water with said means for oxidizing, wherein said means for oxidizing treats said non-potable water by oxidizing organic substances in said non-potable water, disinfecting said non-potable water by destroying parasites, bacteria and viruses in said non-potable water, and causing coagulation of colloids in said non-potable water;
- filtering said treated non-potable water with said means for filtering, wherein said means for filtering includes granular activated carbon and filters said treated non-potable water to remove said oxidized organic substances, said destroyed parasites, bacteria and viruses, and said colloids from said treated non-potable water to provide potable water;
- providing means capable of generating a biocide from dissolved salts present in said filtered water; and
- desalinating filtered water.

23. The method of claim 22 wherein said potable water is contacted with said biocide.

24. The method of claim 23 wherein said biocide is selected from the group consisting of chlorine, sodium hypochlorite, hydrogen peroxide, chlorine dioxide and ozone.

25. The method of claim 23, wherein said step of contacting includes supplying liquid chlorine and said filtered water to a chlorine contact chamber to contact said liquid chlorine with said water.

26. The method of claim 22, wherein said steps are substantially continuously performed for the purification of non-potable water.

27. The method of claim 22, further comprising the step of transporting said system with a wheeled trailer of the type which is capable of being towed by a vehicle, wherein said system is fully contained within said trailer.

28. The method of claim 22, wherein said step of filtering is performed with cartridge filters.

29. The method of claim 22, wherein said step of oxidizing includes supplying ozone and said water to an ozone contact chamber to contact said ozone with said water.

30. The method of claim 22, further comprising automatically controlling said steps.

31. The method of claim 30, wherein said automatically controlling is performed via a programmable logic controller.

* * * * *

UNITED STATES PATENT AND TRADEMARK OFFICE
CERTIFICATE OF CORRECTION

PATENT NO. : 5,547,584

DATED : Aug. 20, 1996

INVENTOR(S) : Capehart, J.D. et al.

It is certified that error appears in the above-indentified patent and that said Letters Patent is hereby corrected as shown below:

| | |
|---|---|
| Column 7, line 52 | After "SFV-150," and before "½" replace "¹" with --1-- |
| Column 9, line 43 | Delete "20" |
| Column 11, line 31 | Replace "Mec-0-Matic" With --Mec-O-Matic-- |
| Column 17, line 4 | Delete "20" |
| Column 22, line 8 | Replace "steps" With --step-- |
| Column 22, line 22 | Replace "steps" With --step-- |
| Column 22, line 50 | After "said" Insert --filtered-- |

UNITED STATES PATENT AND TRADEMARK OFFICE
CERTIFICATE OF CORRECTION

PATENT NO. : 5,547,584
DATED : August 20, 1996
INVENTOR(S) : Capehart, J.D. et. al.

It is certified that error appears in the above-indentified patent and that said Letters Patent is hereby corrected as shown below:

Column 23, line      Replace "desalintaining"
                     With --desalinating--

Signed and Sealed this

Eleventh Day of February, 1997

Attest:

BRUCE LEHMAN

Attesting Officer        Commissioner of Patents and Trademarks